United States Patent
Barny et al.

(10) Patent No.: US 7,581,441 B2
(45) Date of Patent: Sep. 1, 2009

(54) METHOD AND DEVICE FOR PROTECTING AN AIRCRAFT AGAINST CLEAR AIR TURBULENCE

(75) Inventors: Hervé Barny, Valence (FR); Jean-Claude Lehureau, Sainte Genevieve des Bois (FR); Patrick Feneyrou, Igny (FR)

(73) Assignee: Thales (FR)

( * ) Notice: Subject to any disclaimer, the term of this patent is extended or adjusted under 35 U.S.C. 154(b) by 0 days.

(21) Appl. No.: 12/055,696

(22) Filed: Mar. 26, 2008

(65) Prior Publication Data

US 2009/0013776 A1    Jan. 15, 2009

(30) Foreign Application Priority Data

Mar. 27, 2007   (FR)   ................... 07 02225

(51) Int. Cl.
   *G01P 5/00* (2006.01)
(52) U.S. Cl. ............... 73/170.11; 73/170.02; 73/170.14
(58) Field of Classification Search .. 73/170.01–170.15
   See application file for complete search history.

(56) References Cited

U.S. PATENT DOCUMENTS 5,341,677 A * 8/1994 Maris .......................... 73/147
6,000,285 A * 12/1999 Leslie et al. ............. 73/170.07
6,070,460 A * 6/2000 Leslie et al. ............. 73/170.07
6,237,405 B1   5/2001 Leslie

OTHER PUBLICATIONS

John L. Keller: "Clear Air Turbulence as a Response to Meso and Synoptic-Scale Dynamic Process" Monthly Weather Review, vol. 118, 1990, pp. 2228-2248, XP002461885.
Michael J. Oard: "Application of a Diagnostic Richardson Number Tendency to a Case Study of Clear Air Turbulence" Journal of Applied Meteorology, vol. 13, No. 7, Oct. 1974, pp. 771-777, XP008086754.
Edward V. Browell et al.: "Airborne LIDAR systems" Laser Remote Sensing, 2005, pp. 723-779, XP008086748.

* cited by examiner

*Primary Examiner*—Andre J Allen
*Assistant Examiner*—Jermaine Jenkins
(74) *Attorney, Agent, or Firm*—Lowe Hauptman Ham & Berner, LLP

(57) ABSTRACT

The invention relates to a method of protecting aircraft in flight against clear air turbulence (CAT). Consider an aircraft occupying a position P and moving horizontally at a speed V, a plane $P_{H0}$ being the horizontal plane passing through P. According to the invention, the method includes performing at least one pair of evaluations of air temperature $T_B$, $T_C$ at two points B, C which have positions that are symmetrical relative to the plane $P_{H0}$. At least one pair of horizontal air speed evaluations are performed $VH_B$, $VH_C$ at the two points B, C; An air temperature gradient is determined; A horizontal air speed gradient is determined; An index signifying a presence of CAT is determined; The preceding steps are repeated; A trend is analyzed over time of the index.

20 Claims, 3 Drawing Sheets

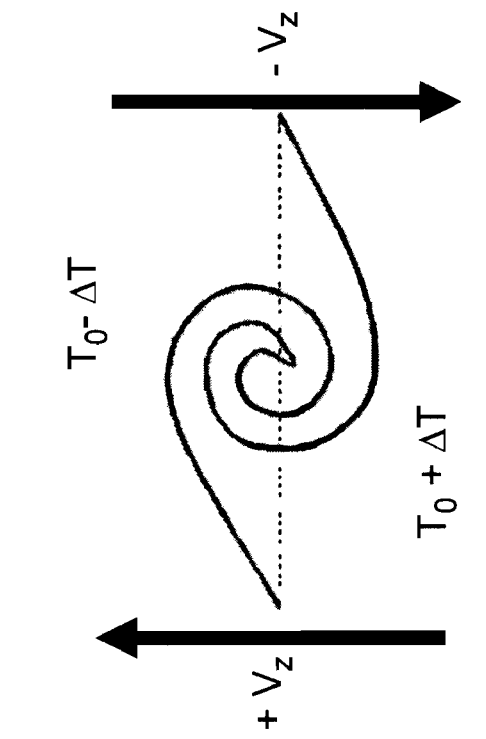
FIG.2c
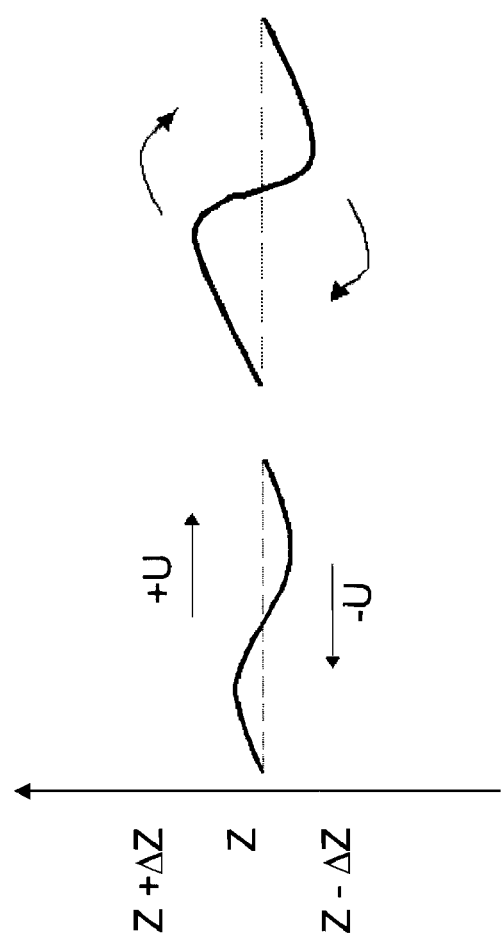
FIG.2b
FIG.2a

METHOD AND DEVICE FOR PROTECTING AN AIRCRAFT AGAINST CLEAR AIR TURBULENCE

RELATED APPLICATIONS

The present application is based on, and claims priority from, French Application Number 07 02225, filed Mar. 27, 2007, the disclosure of which is hereby incorporated by reference herein in its entirety.

FIELD OF THE INVENTION

The field of the invention is that of the protection of aircraft in flight against clear air turbulence. The invention relates to a method of protecting aircraft in flight against clear air turbulence, it is of particular interest for the protection of passenger transport aeroplanes and more specifically aeroplanes on board which passengers are encouraged to move around. The invention also relates to a device for protecting an aircraft in flight against clear air turbulence.

In flight, an aircraft can pass through or close to an area of space in which a clear air turbulence (also known by the acronym CAT) phenomenon is occurring. Now, a turbulence can have different damaging consequences on the aircraft.

Among these consequences, the commonest relates to physical accidents involving the people on board the aircraft: passengers and/or crew members. These accidents are caused by abrupt acceleration variations or unexpected rotations of the aircraft when it is passing through an area in which a CAT is taking place. These acceleration variations produce, on the one hand, impacts between the people and the walls of the aircraft, for example against the ceiling of the passenger cabin when the people are not fastened to their seat, and on the other hand, people being bumped by objects which are not solidly fixed to the structure of the aircraft, such as service carts. Between 1981 and 1997, the major American airlines reported several hundred accidents and the corresponding annual cost is estimated at between 30 and 60 million US dollars.

Much more rarely, an aircraft passing through an area in which a CAT phenomenon is taking place can have its structure damaged by violent winds prevailing in the area.

CATs can have consequences of such a gravity that the CAT phenomena are currently considered by the world airlines to be one of the most worrying atmospheric hazards.

Moreover, it can be predicted that if no effective protection measure is implemented, the number of accidents linked to CATs will increase. This predictable increase is linked to the general increase in air traffic, to the commissioning of large carrier, long haul aeroplanes, on board which the passengers are likely to move around to relax, and finally, to the application of air routes specific to a given flight, limiting the possibilities of pilot-to-pilot alerting should turbulence be detected.

The turbulence is reflected in local abrupt variations in wind speed and direction, which cause disorderly and uncontrolled aeroplane movements. The CAT phenomenon is a type of turbulence present in clear air, normally at high altitude, unlike a turbulence directly linked to convection, the latter being characterized by the appearance of clouds. The mechanisms for the creation of CATs and their properties remain current research topics because these phenomena are not fully understood, notably because of the lack of experimental data. However, a distinction is normally drawn between three turbulence categories, as is the case, for example, in the circular AC120-88A published by the US Federal Aviation Administration, commonly known by the acronym "FAA":
  turbulence linked to a convection phenomenon;
  turbulence linked to a relief wave;
  turbulence linked to a Kelvin-Helmholtz instability.

The first turbulence category is encountered when a storm system develops, for example a cumulonimbus, as represented in FIG. 1a. This development can be very rapid on the atmospheric scale, and appears as a pulse generating oscillations in stable high altitude atmospheric conditions. The oscillations can be propagated over very long distances, but with their energy varying in inverse proportion to their propagation distance, in principle only the region close to the storm is disturbed. However, above the storm system, a Venturi effect can form, with a jet-stream generating a turbulent atmosphere as far as the tropopause at high altitude, possibly a great distance from the storm system.

The second category of turbulence combines phenomena generated by a relief on the ground, as represented in FIG. 1b. A relief wave is mainly reflected in a turbulent rotor zone at low altitudes close to the relief: normally, aircraft performing commercial flights are not affected by this relief wave. At higher altitudes, the atmospheric layers are subject to a stable ripple phenomenon in which the vertical speeds can reach 5 to 15 meters per second, with a low frequency known by the name of "Brunt-Vaisala frequency". This phenomenon has effects on an aircraft which can easily be neutralized by an action on the part of the pilot or the automatic pilot of the aircraft. However, when the relief is almost two-dimensional, for example in the ranges of the Pyrenees, the Sierra Nevada or the Andes, a high altitude rotor can occur above the ripple phenomenon and upstream of the decompression which causes strong turbulence. This ripple phenomenon is localized in a small spatial area and is of high intensity.

The third turbulence category combines phenomena generated by an instability known by the name of "Kelvin-Helmholtz". As represented in FIG. 1c, this instability can be formed in the presence of a vertical wind gradient in certain atmospheric conditions, it can be likened to a shearing between two atmospheric layers, each of the layers being driven by a horizontal motion, the two horizontal motions having an opposite direction. In general, this type of phenomenon does not give rise to the formation of clouds.

Hereinafter, "Clear Air Turbulence" or CAT, will be used to designate an atmospheric phenomenon localized in a small spatial area, having a high intensity that can cause vertical wind variations greater than 3 meters per second and not being detectable by the presence of clouds or precipitations. As has been seen, CATs can be part of one of the three known turbulence categories.

To protect an aircraft, its passengers and its crew from the consequences of a CAT, a number of operational scenarios can be envisaged:
  avoidance of the risk area, by modifying the path of the aeroplane;
  fastening of the seatbelts and mooring of the objects;
  action on the flight controls to mitigate the consequences of the turbulence on the aeroplane.

The avoidance by the aircraft of the risk area presupposes an identification and a locating of an area of turbulence with sufficient prior notice to reschedule the path of the aircraft, with the agreement of air traffic control, or typically at least 5 minutes.

The fastening of the seatbelts and mooring of the objects is the most effective protection against the hazard associated with CATs: statistics show that 98% of injured passengers were not secured at the time of the incident. For such a measure to be totally effective, the detection of the area of turbulence must be performed with prior notice of around 2 to 3 minutes. A shorter prior notice, that is of the order of at least 30 seconds, can make it possible to take initial emergency measures.

The prior notice required by an action on the flight controls is much shorter: it is typically of the order of 0.3 to 0.5 seconds. However, in this case, it is essential to detect a presence of turbulence and also identify the wind speeds (horizontal and vertical) with which the aircraft will be confronted.

To sum up, for an aircraft flying, for example, at a speed of 250 meters per second, a prior notice of 2 minutes that is necessary to fasten the seatbelts of all the passengers and moor all the objects requires a presence of turbulence to be identified in an area 30 kilometers distant from the aircraft.

The current means of identifying risk areas are as follows:
weather forecasts or pilot observations;
measurements by an aircraft weather radar;
passive infrared or radiofrequency band measurements;
active optical measurements.

Weather forecasts are available, they are based on calculations of indices involving a temperature and wind speeds, and their gradients, at different altitudes. These forecasts have a quality that is not adequate for detecting a presence of CAT notably in terms of their spatial resolution: in practice, the basic mesh of the digital models of the atmosphere that are used, of the order of a few kilometers horizontally and 1000 meters vertically, is very significantly greater than the spatial dimensions of the CATs. Furthermore, the time resolution of these models, typically of the order of a few hours, is not sufficient relative to the speed of change of the turbulence. Similarly, observations, satellite images or pilot reports have a period of validity that is too short to allow for effective and reliable protection.

A detection of CAT presence based on an X-band reflectivity measurement is possible only in the presence of liquid precipitations (rain) or solid precipitations (hail). In clear air, the echo is too weak to be usable and conventional weather radars do not therefore allow for CATs to be detected. Recently, new weather radars have appeared that apply an automatic vertical sweep or else a turbulence prediction based on characteristics of a radar echo returned by areas of high reflectivity, for example areas of precipitation. The use of these new technologies can make it possible to identify turbulence associated with a storm-type convective activity but will remain ineffective in the cases of turbulence associated with a relief wave or with a Kelvin-Helmholtz instability.

A radiometer is an instrument that can be used to passively measure a temperature of a volume of air by analysing electromagnetic waves emitted by this volume of air in different spectral windows. Such an instrument cannot however be employed to directly detect a thermal signature of the CAT, because on the one hand, the spatial resolution of such a method is inadequate and on the other hand, its use requires complex calibration.

Finally, a LIDAR, an acronym standing for "Light Detection and Ranging", is a measuring device similar to a radar which is based on the use of a probe radiation from the optical frequency domain. By using a Doppler shift of an optical signal backscattered by a volume of atmosphere, a LIDAR can be used to identify a field of air speed, in front of the aircraft for example. By using certain spectral properties of the backscattered signal (Rayleigh ray), a LIDAR makes it possible to identify a thermal signature of the CAT.

However, there is a stumbling block which is a technological difficulty associated with the power of the laser sources with which a LIDAR likely to be on board an aircraft can be equipped. This technological difficulty limits the detection range of a LIDAR to a distance of the order of 10 kilometers, or a prior notice of the order of 40 seconds for an aircraft moving at a subsonic cruising speed.

SUMMARY OF THE INVENTION

The aim of the invention is to overcome this drawback: it consists in employing a LIDAR to predict a presence of CAT rather than to directly detect a presence of CAT. More specifically, the invention relates to a method of protecting an aircraft in flight against clear air turbulence, the aircraft occupying a position P and moving horizontally at a speed V, a plane $P_{H0}$ being the horizontal plane passing through P, characterized in that it comprises the following steps:

Performing at least one pair of evaluations of the air temperature $T_B$, $T_C$ at two points B, C which have positions that are symmetrical relative to the plane $P_{H0}$;

Performing at least one pair of evaluations of the horizontal air speed $VH_B$, $VH_C$ at two points B, C;

Determining an air temperature gradient from the pair of evaluations of the air temperature $T_B$, $T_C$;

Determining a horizontal air speed gradient from the pair of evaluations of the horizontal air speed $VH_B$, $VH_C$;

Determining an index signifying a presence of clear air turbulence from the air temperature gradient and from the horizontal air speed gradient;

Repeating the preceding steps;

Analysing a trend over time of the index;

When the analysis of the trend over time of the index and an analysis of the path of the aircraft indicate that the aircraft will pass through an area subject to clear air turbulence, taking at least one aircraft safety measure;

When a time analysis of the index and an analysis of the path of the aircraft indicate that the aircraft will leave an area subject to clear air turbulence, alerting a crew of the aircraft.

A first advantage of the invention stems from the fact that it is based on a proven method of evaluating air temperature and wind speed at short distance to predict a presence of CAT at long distance.

A second advantage of the invention arises from the fact that the air temperature and wind speed evaluations can be performed at high frequency and allow for a high frequency evaluation of the index characterizing a presence of CAT. The high frequency of the evaluations makes it possible to obtain a time analysis of the values of the index providing a prediction of CAT presence.

The invention also relates to a device for protecting an aircraft in flight against clear air turbulence according to the invention, characterized in that it comprises:

an optical probe measuring device for performing at least one pair of evaluations of the air temperature $T_B$, $T_C$ at two points B, C which have positions that are symmetrical in relation to the plane $P_{H0}$, the position of the points (B, C) being defined relative to the position P of the aircraft;

an optical probe measuring device for performing at least two pairs of relative air speed projection measurements in relation to the aircraft ($VR_{BG}$, $VR_{BD}$), ($VR_{CG}$, $VR_{CD}$) at two measurement points ($B_G$, $B_D$), ($C_G$, $C_D$), respectively on a measurement axis linking P to each secondary measurement point, the measurement points ($B_G$, $B_D$), ($C_G$, $C_D$) belonging to a horizontal plane passing through the point B, C, the measurement points ($B_G$, $B_D$), ($C_G$, $C_D$) having positions that are symmetrical relative to the point B, C and are equidistant from P;

means for combining the pairs of speed projection measurements ($VR_{BG}$, $VR_{BD}$), ($VR_{CG}$, $VR_{CD}$) to evaluate the horizontal air speed $VH_B$, $VH_C$ at the point B, C;

means for determining an air temperature gradient from a pair of evaluations of the air temperature $T_B$, $T_C$;

means for determining a horizontal air speed gradient from a pair of evaluations of the horizontal air speed $VH_B$, $VH_C$ at the points B, C;

means for determining an index signifying a presence of clear air turbulence from the air temperature gradient and from the horizontal air speed gradient;

means for analysing a trend over time of an index;

means for determining whether the aircraft is about to enter into an area subject to clear air turbulence;

means for taking an aircraft safety measure, when the aircraft is about to enter into an area subject to clear air turbulence;

means for determining whether the aircraft is about to leave the area subject to clear air turbulence;

means for alerting a crew of the aircraft, when the aircraft is about to leave an area subject to clear air turbulence.

One advantage of the device according to the invention lies in the fact that it implements a proven optical probe measuring device to perform short distance air volume temperature and air volume speed measurements as well as simple and inexpensive analysis means to perform a time analysis of the trend of the index values.

A second advantage of the device according to the invention is that it provides evaluations of air temperature and evaluations of horizontal speed of air volumes at a high rate making it possible to predict that an aircraft will pass through an area of space in which there is a CAT phenomenon with sufficient notice for effective aircraft protection measures to be taken.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIGS. 2a, 2b, 2c represent, by side view, three steps in the formation of a "Kelvin-Helmholtz" type clear air turbulence;

DETAILED DESCRIPTION OF THE INVENTION

Figure 1C:
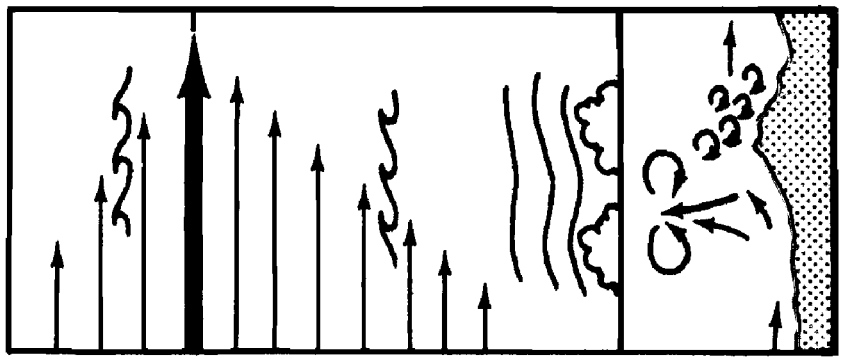
FIGS. 1a, 1b, 1c, already described, respectively represent one of the clear air turbulence categories.
Figure 1B:
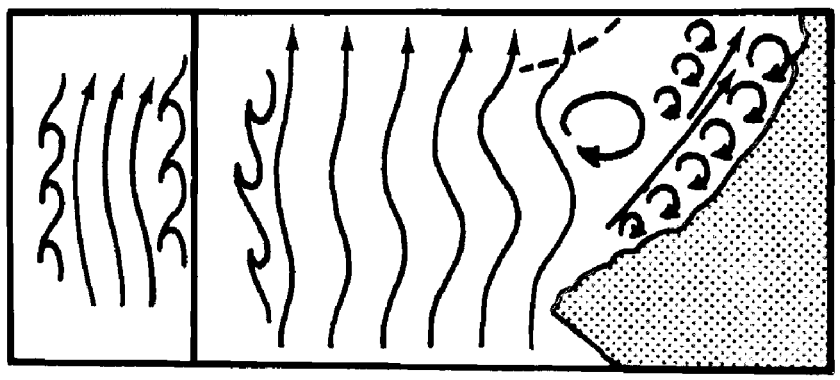
Figure 1A:
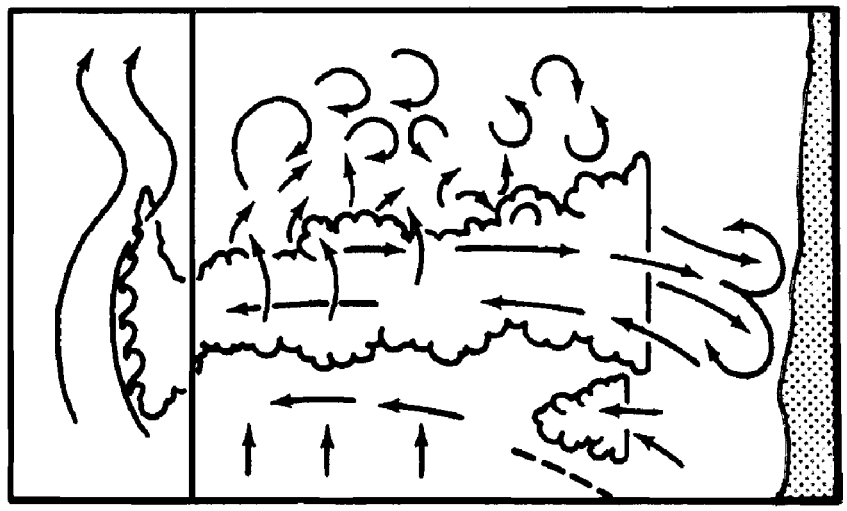

From one figure to another, the same elements are identified by the same references.

In the presence of a horizontal wind gradient between two air layers and in certain atmospheric conditions, a Kelvin-Helmholtz instability phenomenon can occur, characterized by a local appearance of a vertical speed difference $V_z$ and a temperature variation between these two layers leading to the formation of a roll. The vertical speed difference can be the cause of temporary changes to the angle of incidence of an aircraft affecting the lift of the aircraft.

FIGS. 2a, 2b and 2c represent a formation of clear air turbulence at three successive moments.

An index evaluating a ratio between a kinetic energy and a potential energy of horizontally-layered clouds provides a way of revealing a clear air turbulence from a temperature gradient map and an air speed gradient map.

The Richardson number $R_i$ is such an index: its expression is as follows:

$$R_i = g \frac{\frac{d\theta_p}{dz}}{\theta_p \left(\frac{dU}{dz}\right)^2} = \frac{N^2}{\left(\frac{dU}{dz}\right)^2}$$

where:

$\theta_p = T(P_0/P)^k$ is a potential temperature, that is a temperature that is constant along an adiabatic, and N is the Brunt-Vaisala oscillation. The constant k denotes, in the preceding expression, the value $k=2/7$.

$d\theta_p/dz$ is a vertical potential air temperature gradient;

$dU/dz$ is a vertical gradient of horizontal air speed;

g is the acceleration of gravity.

Advantageously, the index is a Richardson number.

Generally, it is estimated that, when $R_i$ takes a value less than 0.25, the ratio of kinetic energy and potential energy of the layers is sufficient to overcome the thermal stability of the atmosphere: a roll then forms as represented in FIG. 2c.

Such an index is evaluated by evaluating a ratio between a vertical potential temperature gradient of two air layers of different altitudes and a vertical gradient of horizontal air speeds of these two layers of air.

Let us consider the plane $P_{H0}$ which is a horizontal plane passing through the position P of the aircraft.

The vertical potential temperature gradient and the vertical gradient of horizontal air speeds can themselves be evaluated by means of an optical probe measuring device performing evaluations of air temperature and evaluations of horizontal air speed in air volumes located about at least two points B and C. The positions of the points B and C are defined relative to the position P of the aircraft, and are symmetrical relative to the plane $P_{H0}$.

Advantageously, the points B, C are separated by a distance 2.H which is greater than 50 meters.

Advantageously, the points B, C are separated from the position P of the aircraft by a distance D which is less than 2 kilometers.

A measurement at a point M of the space is a measurement performed in a volume centered on the point M of the space.

Advantageously, the measurement volume has a longitudinal dimension less than 50 meters.

Advantageously, the measurement volume has a lateral dimension less than 50 meters.

Advantageously, the measurement volume has a vertical dimension less than 50 meters.

Figure 3:
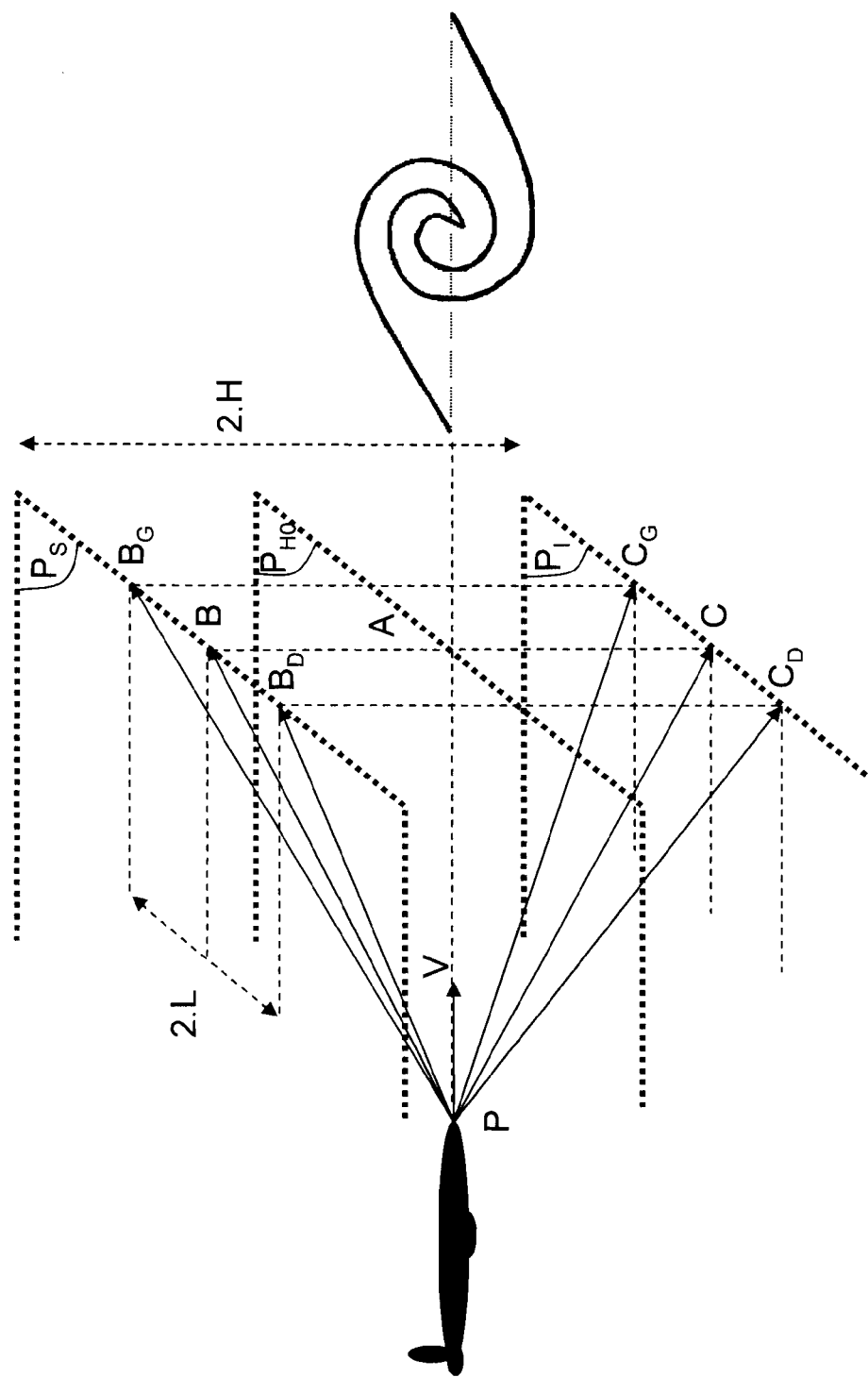
FIG. 3 represents, in perspective view, relative positions of the aircraft and of points B, C at which temperatures and horizontal speeds are evaluated.

FIG. 3 is a perspective view representation of an arrangement of the measurement points B and C.

The plane $P_{H0}$ is the horizontal plane passing through the position P of the aircraft.

Advantageously, evaluating the horizontal air speed $VH_B$, $VH_C$ at a point B, C on the plane $P_{H0}$ entails the following steps:

Performing at least one pair of projection measurements of the relative air speed in relation to the aircraft ($VR_{BG}$, $VR_{BD}$), ($VR_{CG}$, $VR_{CD}$) at two measurement points ($B_G$, $B_D$), ($C_G$, $C_D$), respectively on a measurement axis linking P to each secondary measurement point, the measurement points ($B_G$, $B_D$), ($C_G$, $C_D$) being on a horizontal plane passing through the point B, C, the measurement points ($B_G$, $B_D$), ($C_G$, $C_D$) having positions that are symmetrical relative to the point B, C and are equidistant from P;

Combining the speed projection measurements ($VR_{BG}$, $VR_{BD}$), ($VR_{CG}$, $VR_{CD}$) of the pair to evaluate the horizontal air speed $VH_B$, $VH_C$ at the point B, C.

Advantageously, the measurement points ($B_G$, $B_D$), ($C_G$, $C_D$) are separated by a distance 2.L which is greater than 50 meters.

Advantageously, evaluating an air temperature of the air $T_B$, $T_C$ at a point B, C on the plane $P_{H0}$ includes the following steps:

Performing at least one pair of temperature measurements ($T_{BG}$, $T_{BD}$), ($T_{CG}$, $T_{CD}$) at two measurement points ($B_G$, $B_D$), ($C_G$, $C_D$), the measurement points ($B_G$, $B_D$), ($C_G$, $C_D$) being on a horizontal plane passing through the point B, C, the measurement points ($B_G$, $B_D$), ($C_G$, $C_D$) having positions that are symmetrical relative to the point B, C and are equidistant from P;

Combining the temperature measurements ($T_{BG}$, $T_{BD}$), ($T_{CG}$, $T_{CD}$) of the pair to evaluate the air temperature $T_B$, $T_C$ at the point B, C.

So as to provide for the detection of turbulence at any altitude, a detection must be based on air molecule characteristics and not on aerosol particle characteristics. In practice, at an altitude at which aircraft move at cruising speed, fluctuations in the concentration of aerosol particles can be significant. This factor leads to the use of an optical probe measuring device operating with a probe radiation having a restricted wavelength to take advantage of an effective section of major backscatter.

Advantageously, the optical probe measuring device emits a radiation with a wavelength from the ultra-violet range.

For example, a wavelength equal to 355 nanometer provides a way of reconciling demands imposed by a necessary transmission in the atmosphere and eye safety considerations.

Advantageously, the optical probe measuring device is an incoherent LIDAR.

A first time analysis of the value of the index consists in detecting a violation by the index of a predefined threshold $S_1$. For example, when the index is the Richardson number, the threshold $S_1$ is equal to 0.25.

Another time analysis of the index value consists in detecting an overshoot of an index reduction speed threshold. For example, when the index is the Richardson number, a presence of turbulence is determined from a detection of a time derivative value of an index falling below a predefined threshold $S_2$.

Depending on whether a presence of turbulence is detected early enough, various aircraft safety measures can be taken.

Advantageously, an avoidance of the area subject to clear air turbulence is an aircraft safety measure.

Advantageously, a fastening of aircraft passenger seatbelts combined with a mooring of the moving objects with which the aircraft is equipped is an aircraft safety measure.

Advantageously, the optical probe measuring device uses a detection of a Rayleigh effect on a probe beam to perform air temperature evaluations.

Advantageously, the optical probe measuring device uses a detection of a Raman effect on a probe beam to perform air temperature evaluations.

Advantageously, the optical probe measuring device uses an amplitude measurement of a backscatter peak of a probe beam to perform air temperature evaluations.

Advantageously, the optical probe measuring device uses a spectral width measurement of a backscatter peak of a probe beam to perform air temperature evaluations.

Advantageously, the optical probe measuring device uses a measurement of a Doppler shift of a probe beam to perform relative air speed projection measurements relative to a measurement axis.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

What is claimed is:

1. A method of protecting an aircraft in flight against clear air turbulence, the aircraft occupying a position P and moving horizontally at a speed V, a plane $P_{H0}$ being the horizontal plane passing through P, comprising the following steps:

performing at least one pair of evaluations of the air temperature $T_B$, $T_C$ at two points B, C which have positions that are symmetrical relative to the plane $P_{H0}$;

performing at least one pair of evaluations of the horizontal air speed $VH_B$, $VH_C$ at two points B, C;

determining an air temperature gradient from the pair of evaluations of the air temperature $T_B$, $T_C$;

determining a horizontal air speed gradient from the pair of evaluations of the horizontal air speed $VH_B$, $VH_C$;

determining an index signifying a presence of clear air turbulence from the air temperature gradient and from the horizontal air speed gradient;

repeating the preceding steps;

Analyzing a trend over time of the index;

when the analysis of the trend over time of the index and an analysis of the path of the aircraft indicate that the aircraft will pass through an area subject to clear air turbulence, taking at least one aircraft safety measure; and when a time analysis of the index and an analysis of the path of the aircraft indicate that the aircraft will leave an area subject to clear air turbulence, alerting a crew of the aircraft.

2. The method according to claim 1, wherein the evaluation of the horizontal air speed $VH_B$, $VH_C$ at a point B, C on the plane $P_{H0}$ comprises the following steps:

performing at least one pair of relative air speed projection measurements in relation to the aircraft ($VR_{BG}$, $VR_{BD}$), ($VR_{CG}$, $VR_{CD}$) at two measurement points ($B_G$, $B_D$), ($C_G$, $C_D$), respectively on a measurement axis linking P to each secondary measurement point, the measurement points ($B_G$, $B_D$), ($C_G$, $C_D$) being on a horizontal plane passing through the point B, C, the measurements points ($B_G$, $B_D$), ($C_G$, $C_D$) having positions that are symmetrical relative to the point B, C, and being equidistant from P; and combining the speed projection measurements ($VR_{BG}$, $VR_{BD}$), ($VR_{CG}$, $VR_{CD}$) of the pair to evaluate the horizontal air speed $VH_B$, $VH_C$ at the point B, C.

3. The method according to claim 2, wherein the measurement points ($B_G$, $B_D$), ($C_G$, $C_D$) are separated by a distance 2.L which is greater than 50 meters.

4. The method according to claim 3, wherein a measurement at a point M of the space is a measurement in a volume centered on the point M of the space, and the measurement volume has a vertical dimension less than 50 meters.

5. The method according to claim 3, wherein the evaluation of an air temperature $T_B$, $T_C$ at a point B, C on the plane $P_{H0}$ comprises the following steps:

performing at least one pair of temperature measurements ($T_{BG}$, $T_{BD}$), ($T_{CG}$, $T_{CD}$) at two measurement points ($B_G$, $B_D$), ($C_G$, $C_D$), the measurement points ($B_G$, $B_D$), ($C_G$, $C_D$) being on a horizontal plane passing through the point B, C, the measurement points ($B_G$, $B_D$), ($C_G$, $C_D$) having positions that are symmetrical relative to the point B, C, and being equidistant from P; and combining the temperature measurements ($T_{BG}$, $T_{BD}$), ($T_{CG}$, $T_{CD}$) of the pair to evaluate the air temperature $T_B$, $T_C$ at the point B, C.

6. The method according to claim 2, wherein a measurement at a point M of the space is a measurement in a volume centered on the point M of the space, and the measurement volume has a lateral dimension less than 50 meters.

7. The method according to claim 2, wherein the evaluation of an air temperature $T_B$, $T_C$ at a point B, C on the plane $P_{H0}$ comprises the following steps:

performing at least one pair of temperature measurements ($T_{BG}$, $T_{BD}$), ($T_{CG}$, $T_{CD}$) at two measurement points ($B_G$, $B_D$), ($C_G$, $C_D$), the measurement points ($B_G$, $B_D$), ($C_G$, $C_D$) being on a horizontal plane passing through the point B, C, the measurement points ($B_G$, $B_D$), ($C_G$, $C_D$) having positions that are symmetrical relative to the point B, C, and being equidistant from P; and combining the temperature measurements ($T_{BG}$, $T_{BD}$), ($T_{CG}$, $T_{CD}$) of the pair to evaluate the air temperature $T_B$, $T_C$ at the point B, C.

8. The method according to claim 1, wherein the evaluation of an air temperature $T_B$, $T_C$ at a point B, C on the plane $P_{H0}$ comprises the following steps:

performing at least one pair of temperature measurements ($T_{BG}$, $T_{BD}$), ($T_{CG}$, $T_{CD}$) at two measurement points ($B_G$, $B_D$), ($C_G$, $C_D$), the measurement points ($B_G$, $B_D$), ($C_G$, $C_D$) being on a horizontal plane passing through the point B, C, the measurement points ($B_G$, $B_D$), ($C_G$, $C_D$) having positions that are symmetrical relative to the point B, C, and being equidistant from P; and combining the temperature measurements ($T_{BG}$, $T_{BD}$), ($T_{CG}$, $T_{CD}$) of the pair to evaluate the air temperature $T_B$, $T_C$ at the point B, C.

9. The method according to claim 1, wherein the index is a Richardson number.

10. The method according to claim 1, wherein the points B, C are separated by a distance 2.H which is greater than 50 meters.

11. The method according to claim 1, wherein the points B, C are separated from the position P of the aircraft by a distance D which is less than 2 kilometers.

12. The method according to claim 1, wherein a measurement at a point M of the space is a measurement in a volume centered on the point M of the space, and the measurement volume has a longitudinal dimension less than 50 meters.

13. Device for protecting an aircraft in flight against clear air turbulence implementing a method according to one of the preceding claims, comprising:

an optical probe measuring device for performing at least one pair of evaluations of the air temperature $T_B$, $T_C$ at two points B, C which have positions that are symmetrical in relation to the plane $P_{H0}$, the position of the points (B, C) being defined relative to the position P of the aircraft;

an optical probe measuring device for performing at least two pairs of relative air speed projection measurements in relation to the aircraft ($VR_{BG}$, $VR_{BD}$), ($VR_{CG}$, $VR_{CD}$) at two measurement points ($B_G$, $B_D$), ($C_G$, $C_D$), respectively on a measurement axis linking P to each secondary measurement point, the measurement points ($B_G$, $B_D$), ($C_G$, $C_D$) belonging to a horizontal plane passing through the point B, C, the measurement points ($B_G$, $B_D$), ($C_G$, $C_D$) having positions that are symmetrical relative to the point B, C and are equidistant from P;

means for combining the pairs of speed projection measurements ($VR_{BG}$, $VR_{BD}$), ($VR_{CG}$, $VR_{CD}$) to evaluate the horizontal air speed $VH_B$, $VH_C$ at the point B, C;

means for determining an air temperature gradient from a pair of evaluations of the air temperature $T_B$, $T_C$;

means for determining a horizontal air speed gradient from a pair of evaluations of the horizontal air speed $VH_B$, $VH_C$ at the points B, C;

means for determining an index signifying a presence of clear air turbulence from the air temperature gradient and from the horizontal air speed gradient;

means for analyzing a trend over time of an index;

means for determining whether the aircraft is about to enter into an area subject to clear air turbulence;

means for taking an aircraft safety measure, when the aircraft is about to enter into an area subject to clear air turbulence;

means for determining whether the aircraft is about to leave the area subject to clear air turbulence; and means for alerting a crew of the aircraft, when the aircraft is about to leave an area subject to clear air turbulence.

14. The device according to claim 13, wherein the optical probe measuring device emits a radiation of wavelength from the ultraviolet range.

15. The device according to claim 13, wherein the optical probe measuring device is an incoherent LIDAR.

16. The method characterized in that the optical probe measuring device according to claim 13, uses a spectral width measurement of a backscatter peak of a probe beam to perform air temperature evaluations.

17. The method according to claim 16, wherein the optical probe measuring device uses an amplitude measurement of a backscatter peak of a probe beam to perform air temperature evaluations.

18. The method according to claim 16, wherein the optical probe measuring device uses a detection of a Raman effect on a probe beam to perform air temperature evaluations.

19. The method according to claim 16, wherein the optical probe measuring device uses a detection of a Rayleigh effect on a probe beam to perform air temperature evaluations.

20. A device according to claim 16, wherein the optical probe measuring device uses a measurement of a Doppler shift of a probe beam to perform relative air speed projection measurements relative to a measurement axis.

* * * * *